United States Patent
Ou et al.

(10) Patent No.: US 7,783,999 B2
(45) Date of Patent: Aug. 24, 2010

(54) ELECTRICAL PARAMETER EXTRACTION FOR INTEGRATED CIRCUIT DESIGN

(75) Inventors: Tsong-Hua Ou, Taipei (TW); Ying-Chou Cheng, Taipei County (TW); Chia-Chi Lin, Hsin-Chu (TW); Ru-Gun Liu, Hsin-Chu (TW); Chih-Ming Lai, Hsin-Chu (TW); Min-Hong Wu, Nantou County (TW); Yih-Yuh Doong, Hsin-Chu (TW); Cliff Hou, Taipei (TW); Yao-Ching Ku, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 155 days.

(21) Appl. No.: 12/016,661

(22) Filed: Jan. 18, 2008

(65) Prior Publication Data

US 2009/0187866 A1    Jul. 23, 2009

(51) Int. Cl.
G06F 17/50     (2006.01)

(52) U.S. Cl. .............................................. 716/4; 716/1
(58) Field of Classification Search ...................... 716/1, 716/4

See application file for complete search history.

(56) References Cited

U.S. PATENT DOCUMENTS

| | | | |
|---|---|---|---|
| 5,048,800 A | 9/1991 | Miyazaki et al. | |
| 5,440,478 A | 8/1995 | Fisher et al. | |
| 5,847,965 A | 12/1998 | Cheng | |
| 5,963,881 A | 10/1999 | Kahn et al. | |
| 6,028,991 A * | 2/2000 | Akashi | 716/14 |
| 6,045,619 A | 4/2000 | Tai et al. | |
| 6,077,310 A | 6/2000 | Yamamoto et al. | |
| 6,289,257 B1 | 9/2001 | Sekine | |
| 6,408,219 B2 | 6/2002 | Lamey, Jr. et al. | |
| 6,410,351 B1 | 6/2002 | Bode et al. | |
| 6,549,864 B1 | 4/2003 | Potyrailo | |
| 6,917,849 B1 | 7/2005 | Pasadyn et al. | |
| 6,968,253 B2 | 11/2005 | Mack et al. | |
| 6,980,873 B2 | 12/2005 | Shen | |
| 7,144,297 B2 | 12/2006 | Lin et al. | |
| 7,360,191 B2 * | 4/2008 | Chang et al. | 716/6 |
| 7,363,207 B2 | 4/2008 | Kamon | |
| 2004/0029299 A1 | 2/2004 | Pasadyn et al. | |
| 2004/0040001 A1 | 2/2004 | Miller et al. | |
| 2004/0093107 A1 | 5/2004 | Good et al. | |

(Continued)

OTHER PUBLICATIONS

Yuxin, Tian, et al. "Impact of Photolithography and Mask Variability on Interconnect Parasitics," 10 pages.

(Continued)

*Primary Examiner*—Jack Chiang
*Assistant Examiner*—Suchin Parihar
(74) *Attorney, Agent, or Firm*—Haynes and Boone, LLP

(57) ABSTRACT

A system, method, and computer readable medium for generating a parameterized and characterized pattern library for use in extracting parasitics from an integrated circuit design is provided. In an embodiment, a layout of an interconnect pattern is provided. A process simulation may be performed on the interconnect pattern. In a further embodiment, the interconnect pattern is dissected into a plurality of segments taking into account OPC rules. A parasitic resistance and/or parasitic capacitance associated with the interconnect pattern may be determined by a physical model and/or field solver.

16 Claims, 4 Drawing Sheets

U.S. PATENT DOCUMENTS

| | | | |
|---|---|---|---|
| 2004/0181299 | A1 | 9/2004 | Yamazaki et al. |
| 2005/0007577 | A1 | 1/2005 | Engelhard et al. |
| 2005/0008227 | A1 | 1/2005 | Duan et al. |
| 2005/0021272 | A1 | 1/2005 | Jenkins et al. |
| 2005/0044514 | A1 | 2/2005 | Wu et al. |
| 2005/0120328 | A1 | 6/2005 | Seltmann et al. |
| 2005/0132306 | A1 | 6/2005 | Smith et al. |
| 2005/0188338 | A1* | 8/2005 | Kroyan et al. ............ 716/9 |
| 2005/0209820 | A1 | 9/2005 | Inoue et al. |
| 2005/0288812 | A1 | 12/2005 | Cheng et al. |
| 2006/0026539 | A1 | 2/2006 | Tetelbaum et al. |
| 2006/0048010 | A1 | 3/2006 | Tai et al. |
| 2006/0111804 | A1 | 5/2006 | Lin |
| 2006/0123380 | A1 | 6/2006 | Ikeuchi |
| 2006/0190876 | A1* | 8/2006 | Yamada ................ 716/5 |
| 2006/0282189 | A1 | 12/2006 | Akisawa et al. |
| 2007/0055892 | A1 | 3/2007 | Pikus |
| 2007/0101305 | A1 | 5/2007 | Smith et al. |
| 2007/0201442 | A1 | 8/2007 | Hekmatpour et al. |
| 2007/0234246 | A1 | 10/2007 | Sinha et al. |
| 2007/0265725 | A1 | 11/2007 | Liu et al. |
| 2007/0266356 | A1* | 11/2007 | Chang et al. ............ 716/6 |
| 2007/0266362 | A1 | 11/2007 | Lai et al. |
| 2007/0277134 | A1* | 11/2007 | Zhang et al. ............ 716/6 |
| 2007/0288219 | A1 | 12/2007 | Zafar et al. |
| 2009/0070725 | A1* | 3/2009 | Yamada ................ 716/12 |
| 2009/0199151 | A1 | 8/2009 | Banerjee et al. |

OTHER PUBLICATIONS

Zhuo, Ying, et al., "A New Methodology for Interconnect Parasitics Extraction Considering Photo-Lithography Effects," pp. 1-6.

U.S. Appl. No. 12/025,933, filed Feb. 5, 2008 by Francis Ko, Chih-Wei Lai, Kewei Zuo, Henry Lo, Jean Wang, Ping-hsu Chen, Chun-Hsien Lin, and Chen-Hua yu for "Novel Methodology to Realize Automatic Virtual metrology," 23 pages.

Cheng, Y.C., et al., "Patterning Effect and Correlated Electrical Model of Post-OPC MOSFET Devices," Proceeding of SPIE vol. 6521 65210G-1 to 65210G-9, 9 pages.

Ottesen, Craig, "Front Opening Pod (FOUP) Fire Protection: A General Overview," International Sematech, Nov. 5, 1999, 10 pages.

Chen, Kuah-Chou, et al., "Integrated Circuits Industry/Front-Opening Unified Pod Auto-Loading Structure," Knowledge Bridge, No. 22, Apr. 2002, 4 pages.

Chappell, Jeff, "The Future is the FOUP—company Business and Marking," Electronic News, Jul. 17, 2000, 2 pages.

Ouyang, Charles, et al., "An Analytical Model of Multiple ILD thickness Variation induced by Interaction of Layout Pattern and CMP Process," IEEE Transactions on Semiconductor Manufacturing, Aug. 2000, 7 pages.

Raghvendra, Srinivas, et al., "DFM: Linking Design and Manufacturing," Proceedings of the 18th International conference on VLSI Design held jointly with 4th International Conference on Embedded Systems Design, VLSID, 2005, 4 pages.

Tsuijikawa, Hiroyuki, et al., "Power=Supply Noise Reduction with Design for Manufacturability," IEICE Trans Fundamentals, vol. E88-A, No. 12, Dec. 2005, 8 pages.

Yue, H. H., et al., "Fault Detection of Plasma Etchers using Optical Emission Spectra," Aug. 2000, IEEE Transactions on Semiconductor Manufacturing, vol. 13, Issue 13, 12 pages.

Huang, Yi-Ting, et al., "Importance of Data Quality in Virtual metrology," IEEE Industrial Electronics, IECON 2006, 32nd Annual Conference, Nov. 6-10, 2006, 6 pages.

Chang, Yaw-Jen, et al., "Virtual Metrology Technique for Semiconductor Manufacturing," Neural Networks, 2006, IJCNN '06, International Joint conference Jul. 16-21, 2006, 5 pages.

Lin, Tung-Ho, et al., "A Virtual Metrology Scheme for Predicting CVD Thickness in Semiconductor Manufacturing," Robotics and Automation, ICRA Proceedings 2006, IEEE International Conference May 15-19, 2006, 6 pages.

* cited by examiner

ELECTRICAL PARAMETER EXTRACTION FOR INTEGRATED CIRCUIT DESIGN

BACKGROUND

The present disclosure relates generally to design, layout, testing, and fabrication of an integrated circuit and, more particularly, to determining parasitic resistance and capacitance of a layout of an integrated circuit (IC).

In designing an integrated circuit, after logic design is completed (e.g., register-transfer level (RTL) design), physical layout design is performed by placing and routing an integrated circuit provided by the logic design. Based upon the physical layout of an integrated circuit device (e.g., chip), various procedures are performed to ensure that the device will function appropriately and/or to better understand the performance of the device, including, for example, the delay time. These procedures typically include a layout parameter extraction (LPE) process performed for the layout design of the IC.

In an LPE process, extraction (e.g., calculation) of parasitic parameters such as, parasitic resistance and/or parasitic capacitance (hereinafter described as RC parameters), is performed. The parasitic resistance and/or capacitance are associated with interconnect patterns (e.g., conductive paths of an integrated circuit). Typically, the LPE process is accomplished by an LPE tool which is provided with a library for a given technology; the library includes interconnect patterns typically used in designing an IC and associated RC parameters. The library is used by the LPE tool to extract the RC parameters of a layout of an IC and thus, to predict the RC parameters of a fabricated IC. However, conventional methods for prediction of RC parameters are typically inaccurate. By way of example, the actual features (e.g., interconnect patterns) printed on a substrate often vary from the features as they are drawn in a layout design. This difference may result in inaccuracies of the RC parameters predicted by extraction of the RC parameters from a layout design of an IC, as compared to the RC parameters associated with the fabricated IC chip. Any inaccuracies in the predicted RC parameters can lead to inaccuracies in other IC parameter such as delay time.

As such an improved extraction of electric parameters of an interconnect pattern is desired.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is understood that specific embodiments are provided herein as examples to teach the broader inventive concept, and one of ordinary skill in the art can easily apply the teaching of the present disclosure to other methods or apparatus. In addition, it is understood that the methods and apparatus discussed in the present disclosure include some conventional structures and/or processes. Since these structures and processes are well known in the art, they will only be discussed in a general level of detail. Furthermore, reference numbers are repeated throughout the drawings for sake of convenience and example, and such repetition does not indicate any required combination of features or steps throughout the drawings.

Figure 1:
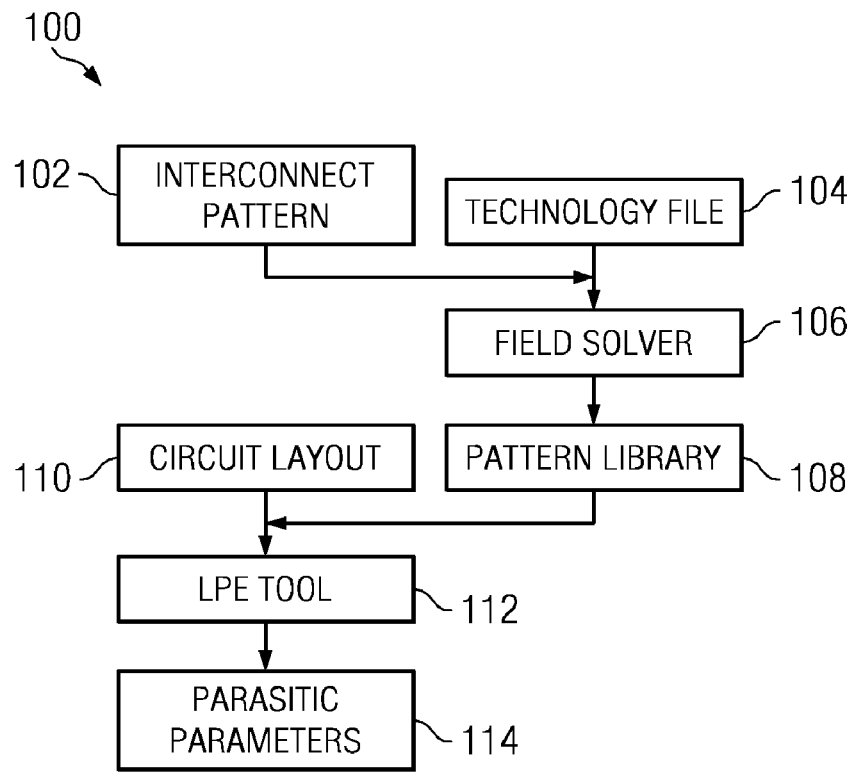
FIG. 1 is a block diagram illustrating an embodiment of an LPE methodology.

Referring to FIG. 1, a block diagram of an LPE methodology 100 is illustrated. An interconnect pattern 102 and a technology file 104 are provided to a field solver 106. The field solver 106 may include a 2D or 3D field solver known in the art. The field solver 106 generates a pattern library 108. The pattern library 108 may include one or more parasitic resistance and capacitance values associated with the interconnect pattern 102. The generated pattern library 108 is provided with a circuit layout 110 to an LPE tool 112. The LPE tool 112 uses the generated pattern library 108 to extract one or more parasitic parameters 114 associated with the circuit layout 110.

Figure 2:
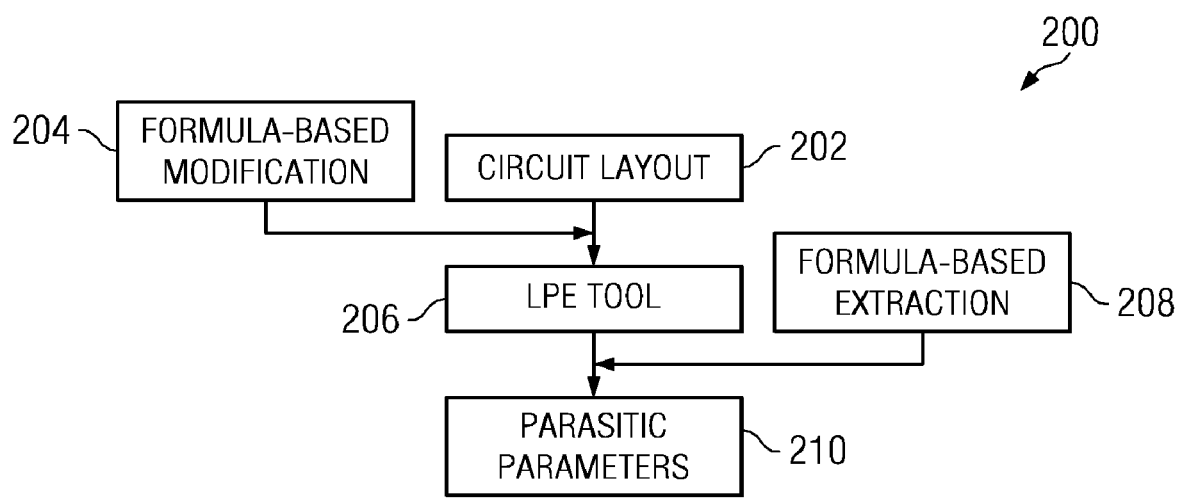
FIG. 2 is a block diagram illustrating an alternative embodiment of an LPE methodology.

Referring now to FIG. 2, a block diagram of an LPE methodology 200 is illustrated. The LPE methodology 200 may be referred to as a formula-based approach to determining parasitic parameters. The LPE methodology 200 includes a circuit layout 202 being input into an LPE tool 206. The circuit layout 202 however has been modified by a formula-based modification 204. The output from the LPE tool 206 is also modified by a formula-based extraction 208 to provide the parasitic parameters 210. It should be noted that the LPE methodology 200 requires a modification of a traditional methodology (e.g., LPE methodology 100) as it requires, for example, formula-based modification 204 and formula-based extraction 208. Such modification may be disadvantageous as use of conventional tools may be inappropriate. In addition, the formulas used in the extraction are typically complex and often cause for increased extraction process times. The formulas themselves may also include inaccuracies.

The LPE methodology 100 and the LPE methodology 200 may also be disadvantageous in that their determination of the parasitic parameters 114 and 210 respectively, include inaccuracies when compared to the parasitics of the circuit layouts as fabricated. The inaccuracies arise from both methodologies neglecting, for example, important process, environmental, and lithographic effects that may affect a designed feature. In other words, the LPE methodologies 100 and 200 may be disadvantageous in that they do not take into account any deviations between the circuit layout 110 and 202 and the same circuit as fabricated (e.g., printed onto a semiconductor substrate). Specifically, a printed feature (e.g., interconnect structure formed on a semiconductor substrate) typically differs from the designed feature (e.g., the "as-drawn" interconnect pattern) of the physical layout. The shape of a feature may vary, for example, in width, thickness, and/or length, from the as drawn or designed shape. As such, the printed feature may provide different parasitics than would be predicted by extraction of an RC parameter of the "same" feature from the circuit layout design. In other words, the RC parameter of a pattern as printed varies from the pattern as-drawn, which is neglected in the methodologies 100 and 200.

The variations may occur because of lithography effects, fabrication process effects, and/or environmental effects that are not taken into account. Lithography effects include, for example, resolution limitations, mask alignment mismatch, depth of focus shifting and exposure energy deviation tolerances of a lithography process and equipment including photomask limitations, critical dimension (CD) variation distribution, effects from optical proximity correction (OPC) features provided on a photomask or other resolution enhancement techniques (RET) employed, and/or other features of the lithography process. The fabrication process effects include process variations stemming from the fabrication processes including lithography processes, etching processes, chemical mechanical polish (CMP) processes, plating processes, chemical vapor deposition (CVD) or other deposition processes, and/or other fabrication processes known in the art. The environmental effects may include effects such as, temperature, impact of features surrounding the interconnect pattern (including, for example, dummy or filler features), thicknesses of a surrounding insulating film, properties of a surrounding insulating film, substrate properties, and/or lithography effects.

Figure 3:
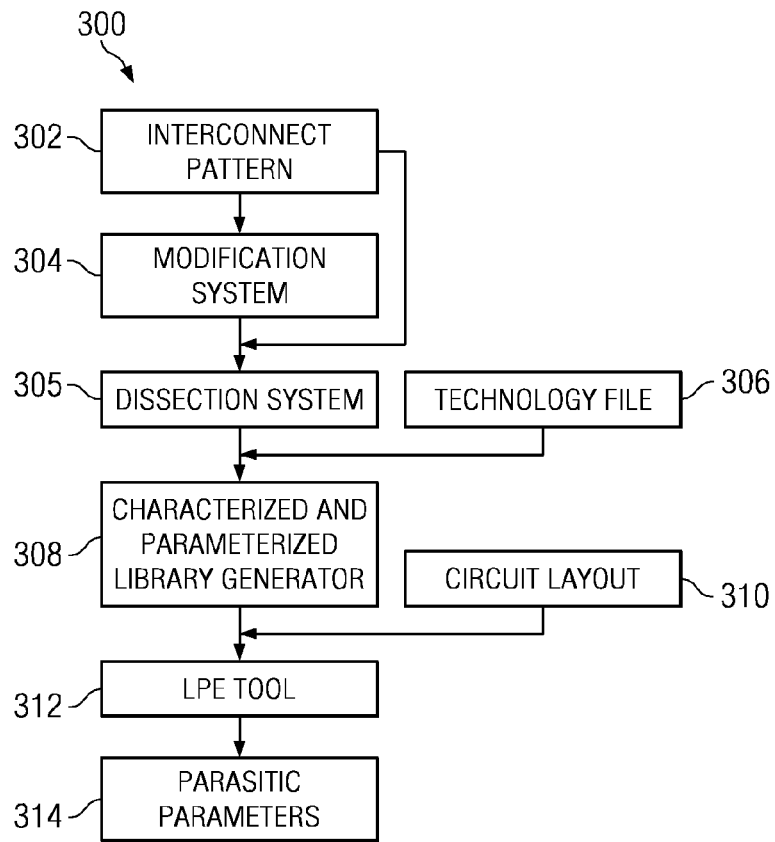
FIG. 3 is a block diagram illustrating an embodiment of an LPE system.

Referring now to FIG. 3, illustrated is a block diagram of an LPE system 300. The LPE system 300 may provide for increased accuracy in prediction of electrical parameters such as RC parameters of an integrated circuit or portion thereof. The LPE system 300 provides RC parameter values that depend upon lithography effects, fabrication processing effects, and/or environmental effects. An embodiment of the LPE system 300 is described in further detail with reference to FIG. 5.

The LPE system 300 includes an interconnect pattern 302 and a technology file 306 that are used to generate a characterized and parameterized pattern library. The interconnect pattern 302 includes a physical design(s) of interconnect patterns(s) (e.g., conductors, transmission paths, metal lines, interconnect net, interconnect structures) commonly used in designing an integrated circuit. A modification system 304 may modify the interconnect pattern 302 or portion thereof such that the as-drawn features more accurately represent a feature as would be printed on a semiconductor substrate. Such modification may take into account, for example, environmental effects, fabrication process effects, and/or lithography effects. The modification system 304 includes a process-model based simulation such as, a photolithography process simulation.

A dissection system 305 dissects (e.g., segments) the interconnect pattern 302 into one or more parts or segments. The dissection may take into account, for example, data included in the technology file 306, a critical dimension, an overlap area, and/or surrounding features (e.g., neighboring objects), including a space to a surrounding feature, in determining how to optimally segment the interconnect pattern. The dissection system 305 may segment the interconnect pattern 302 as drawn and/or the interconnect pattern as modified by the modification system 304. The technology file 306 may include information such as, data associated with the material properties (e.g., dielectric constants), electrical properties, design rules (e.g., feature dimensions), and/or other properties of the process technology with which the generated library is associated. In an embodiment, the technology file 306, or portion thereof, is provided to a characterized and parameterized library generator 308.

The characterized and parameterized library generator 308 provides for extraction of one or more electrical parameters (e.g., RC parameters) for each of the interconnect pattern segments. In an embodiment, the characterized and parameterized library generator 308 translates the shape of the interconnect segment provided into electrical properties using physical and mathematical concepts. The characterized and parameterized library generator 308 may output a netlist annotated with RC parameter(s) for the given interconnect pattern or portion thereof. The characterized and parameterized library generator 308 may take into account, for example, environmental effects, fabrication process effects (including statistical analysis of variations therein), and/or lithography effects in determining the RC parameters of each of the interconnect segments. In an embodiment, the characterized and parameterized library generator 308 provides an RC parameter for an interconnect pattern 302 that includes a plurality of interconnect pattern segments. The characterized and parameterized library generator 308 may include a physical model and/or a field solver.

Thus, the characterized and parameterized library generator 308 generates a characterized and parameterized pattern library including one or more interconnect patterns and their corresponding RC parameter(s) (an "RC library"). The RC library may further provide for environmental factors associated with each interconnect pattern or portion thereof, statistical analysis of each interconnect pattern or portion thereof, for example, a best case and/or a worse case parameter value using information associated with processing conditions and a predetermined process window, and/or other data associated with one or more of the interconnect patterns. In an embodiment, the RC library is generated once for each process technology. The characterized and parameterized pattern RC library may be stored for later use by an LPE tool.

The characterized and parameterized library generator 308 provides an RC library for use by an LPE tool 312. The LPE tool 312 reads an integrated circuit layout 310 and the RC library to compute an electrical parameter, illustrated as parasitic parameter 314, associated with the circuit layout 310. The parasitic parameter 314 may include one or more RC parameters. The circuit layout 310 may include the physical layout of a full-chip IC or portion thereof. The circuit layout 310 is designed for fabrication using the technology associated with the generated RC library. In an embodiment, the parasitic parameters 314 are provided by generating a netlist including the parasitic RC values (e.g., as a SPICE file).

The extracted parasitic parameters 314 may be used in a delay verification process or timing verification process for the circuit layout 310. In an embodiment, the logic design and/or the physical layout design may be modified to provide a different delay and/or timing characteristics. In the embodiment, a subsequent extraction may be run for the modified physical layout. The RC parameter extraction (LPE) is but one-step in verification process and may work in conjunction with a layout-versus-schematic (LVS) check, a design rules check (DRC), an electrical rules check (ERC), and/or other verification processes known in the art. The extracted parameters may be used to identify and/or correct for failure areas, defect areas, or weak areas on the IC, referred to as hotspots. The extracted parameters may be used to characterize the IC or portion thereof, including, for example, a standard cell. The extracted parameters may further be used for manufacturing yield improvement activities.

Figure 4:
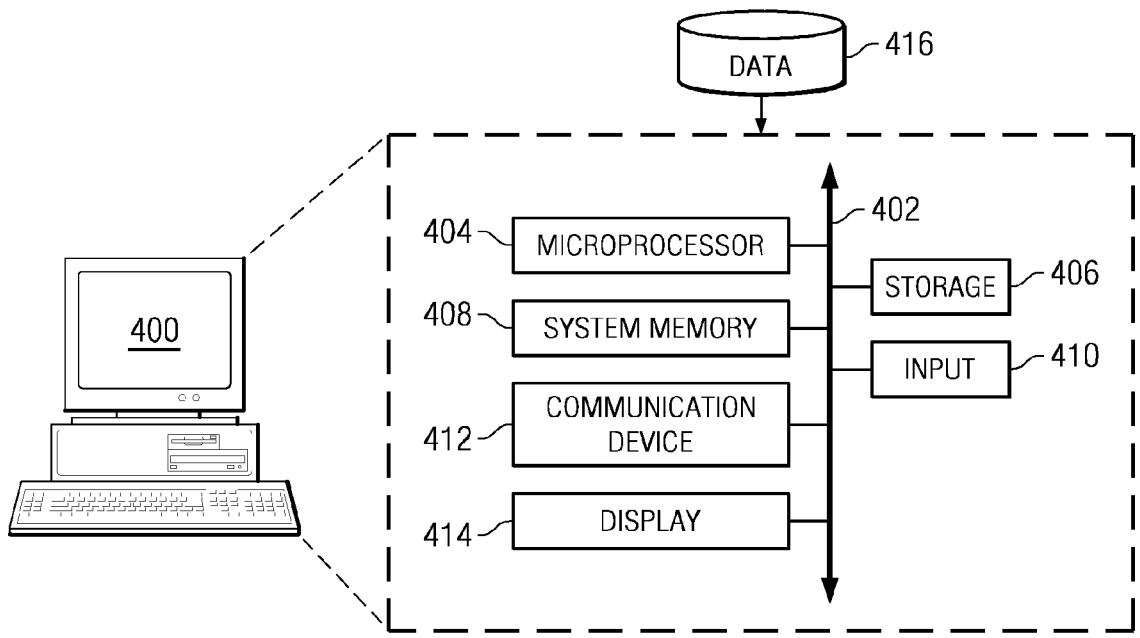
FIG. 4 is a block diagram illustrating an embodiment of a computer system.

Referring now to FIG. 4, illustrated is an embodiment of a computer system 400 for implementing embodiments of the present disclosure including the systems and methods described herein. In an embodiment, the computer system 400 includes functionality providing for the LPE system 300, described above with reference to FIG. 3. In an embodiment, the computer system 400 includes functionality providing for the RC library generation system 500, described with reference to FIG. 5. In an embodiment, the computer system 400 implements the method 700 or portion thereof, described with reference to FIG. 7.

The computer system 400 includes a microprocessor 404, an input device 410, a storage device 406, a system memory 408, a display 414, and a communication device 412 all interconnected by one or more buses 402. The storage device 406 may be a floppy drive, hard drive, CD-ROM, optical device or any other storage device. In addition, the storage device 406 may be capable of receiving a floppy disk, CD-ROM, DVD-ROM, or any other form of computer-readable medium that may contain computer-executable instructions. The communications device 412 may be a modem, a network card, or any other device to enable the computer system to communicate with other nodes. It is understood that any computer system 400 could represent a plurality of interconnected computer systems such as, personal computers, mainframes, PDAs, and telephonic devices. The communications device 412 may allow communications between the computer system 400 and one or more tools or computer systems used in the design, layout, fabrication, and/or testing of IC.

The computer system 400 includes hardware capable of executing machine-readable instructions as well as the software for executing acts (typically machine-readable instructions) that produce a desired result. Software includes any machine code stored in any memory medium, such as RAM or ROM, and machine code stored on other storage devices (such as floppy disks, flash memory, or a CD ROM, for example). Software may include source or object code, for example. In additional software encompasses any set of instructions capable of being executed in a client machine or server. Any combination of hardware and software may comprise a computer system. The codes, executed by a computer, may include code for determining electrical parameters from a physical layout of an integrated circuit. The system memory 408 may be configured to store a net list, physical layout data, a technology file, a library of features to be used in a design of an IC, models, mathematical formula, an RC library, and/or other data provided in the design, layout, fabrication, and/or testing of an IC.

Computer readable mediums include passive data storage, such as RAM as well as semi-permanent data storage such as a compact disk read only memory (CD-ROM). In an embodiment of the present disclosure may be embodied in the RAM of a computer to transform a standard computer into a new specific computing machine. Data structures are defined organizations of data that may enable an embodiment of the present disclosure. For example, a data structure may provide an organization of data, or an organization of executable code. Data signals could be carried across transmission mediums and store and transport various data structures, and thus, may be used to transport an embodiment of the present disclosure. The microprocessor 404 may perform the mathematical functions necessary to extract the RC parameters from a portion of an IC design, such as described above with reference to FIG. 3.

A database 416 may be any standard or proprietary database software known in the art. The physical location of the database 416 is not limiting and may exist remotely from the server, be accessible by internet or intranet. The disclosure of the database 416 includes embodiments that include a plurality of databases. The database 416 may include manufacturing data, design data including netlists, technology files, physical layouts, design libraries, and/or other databases of information useful in the design, layout, fabrication, and/or testing of an IC.

Figure 5:
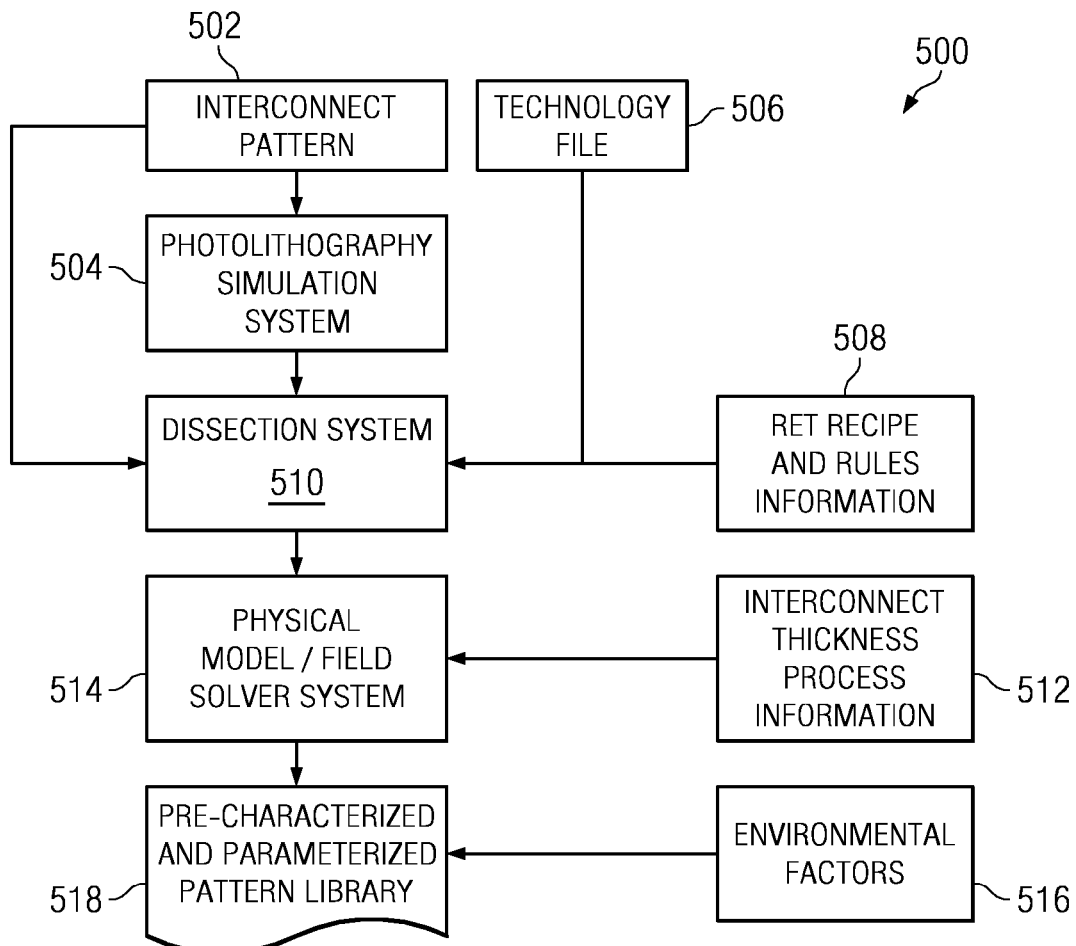
FIG. 5 is a block diagram illustrating an embodiment of the LPE system of FIG. 3.

Referring now to FIG. 5, illustrated is a block diagram of an RC library generation system 500. The library generation system 500 may be used to generate a pre-characterized and parameterized (e.g., including RC parameters) pattern library for use by an LPE tool to extract an RC parameter associated with an IC layout. The system 500 may be an embodiment of the LPE system 300, or portion thereof, described with reference to FIG. 3.

The system 500 provides one or more interconnect patterns 502 that are provided to a photolithography simulation system 504. The interconnect pattern 502 may include physical layout design of one or more interconnect structures that are typically used in the design of an integrated circuit. The interconnect pattern 502 may be referred to as the as-drawn interconnect structures or patterns. The interconnection pattern 502 may be substantially similar to the interconnect pattern 302 of the system 300, described above with reference to FIG. 3. The photolithography simulation system 504 performs a simulation of the fabrication of the interconnect pattern 502. The photolithography simulation system 504 may be substantially similar to the modification system 304, described above with reference to FIG. 3.

The photolithography simulation system 504 may modify the interconnect pattern 502 from the as-drawn form to a shape more accurately representing the pattern as would be printed on a semiconductor substrate (described herein as a simulated-interconnect pattern). In an embodiment, the interconnect pattern 502 or portion thereof may be modified to include an irregular (e.g., non-rectangular) shape. The photolithography simulation system 504 may model the effects of, for example, process variations such as, focus point variations, exposure dosage variations, photomask variations, and/or other process deviations affecting the as-drawn interconnect pattern. The photolithography simulation system 504 may also model lithography effects such as, optical proximity correction and other resolution enhancement techniques that may affect the printing of the as-drawn interconnect patterns. The photolithography simulation system 504 may use manufacturing data such as processing recipes, tool characterizations, manufacturing environment data, statistical process control data, electrical testing data, measurement data, and/or other data gathered in an IC fabrication process to provide the simulation. The photolithography simulation system 504 may also use design data including design rules, RET rules, CD variations, process windows, and/or other design data to provide the simulation. In an embodiment, one or more portions of the interconnect pattern 502 may not be provided to the photolithography simulation system 504. Instead, the interconnect pattern 502, or portion thereof, is provided to a dissection system 510 as an as-drawn interconnect pattern.

Figure 6:
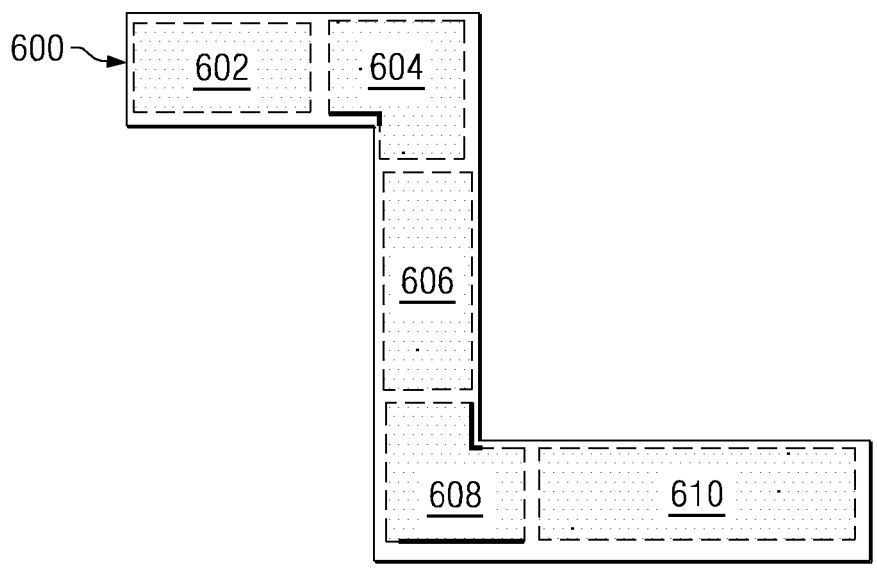
FIG. 6 is a top-view of a schematic illustrating an embodiment of a dissected interconnect pattern.

The photolithography simulation system 504 provides simulated-interconnect patterns to the dissection system 510. The dissection system 510 receives the as-drawn interconnect patterns and/or the simulated interconnect patterns, a technology file 506, and RET recipe and rules information 508. The dissection system 510 may be substantially similar to the dissection system 305, described above with reference to FIG. 3. The dissection system 510 is used to dissect (e.g., segment) the provided interconnect pattern(s) into sections using a technology file 506 and RET rules and recipe information 508. The RET recipe and rules information 508 may include tables and/or expressions illustrating RET recipe and rules information such as those rules and recipes used for providing optical proximity correction (OPC) features. The rules and recipes may include, for example, target points, bias rules, dissection rules, and/or other rules and recipes known in the art. For example, in an embodiment, a dissection rule provides for dissection a given distance from a corner of an interconnection pattern. The technology file 506 may be substantially similar to the technology file 306 described above with reference to FIG. 3. In an embodiment, the dissected patterns (described herein as interconnect pattern segments) may be classified and stored in a library. In an embodiment, environmental effects are also used by the dissection system 510 to determine the dissection. In an embodiment, electrical behavior of the provided interconnect patterns and/or surrounding features. FIG. 6 illustrates an embodiment of a dissection of an interconnect pattern 600. The dissection includes creating segments 602, 604, 606, 608, and 610. The dissection of the interconnect pattern 600 may be determined by the dissection system 510.

One or more of the interconnect pattern segments, including as-drawn pattern segments and simulated-pattern segments, are provided to the physical model/field solver system 514. The physical model/field solver system 514 may be substantially similar to the RC library generator 308, described above with reference to FIG. 3. The physical model/field solver system 514 also receives information associated with interconnect thickness illustrated as interconnect thickness process information 512. The interconnect thickness process information 512 may include data associated with chemical mechanical polish (CMP) process used in fabricating the IC. The data may include manufacturing data such as thickness targets, processing recipes, tool characterizations, manufacturing environment data, statistical process control data, electrical testing data, measurement data, and/or other data gathered in an IC fabrication process. The interconnect thickness process information 512 is used by the physical model/field solver 514 to extract one or more electrical parameters associated with the interconnect patterns. In an embodiment, the interconnect thickness process information 512 is used to provide a simulation of the process such as, the CMP process, for the interconnect pattern.

In an embodiment, the physical model/field solver 514 includes a physical-based shape equivalent calculator and a field solver for the enhancement and assistance of the physical based shape calculator. The physical-based shape equivalent approach, for instance, a methodology of conformal mapping solution and/or a Fast Fourier Transform, is applied in determining the RC parameters of a pattern. The physical-based shape equivalent approach may consider the shape of the interconnect, including as provided by lithographic simulation, as well as the electrical behavior of the pattern. The field solver may be used to prove the accuracy of a physical model and to calibrate external effects (e.g., environmental effects), such as thin film material interface and line edge roughness (LEF), that a physical-based shape equivalent approach may not take into account. In an embodiment, the physical model/field solver 514 includes a physical model that includes the physical-based shape equivalent calculator. The physical model may translate the shape of an interconnect pattern (e.g., the as-drawn interconnect segments and/or the simulated-interconnect segments) to electrical properties using physical and mathematical concepts. The electrical properties include equivalent resistance capacitance and further calculated equivalent dimensions as lengths, widths, and spaces of a specific dissected segment. The physical model may prevent electrical field distortion and ensure the device is modeled accurately. The extraction of the equivalent dimensions by a physical model provides for simplified extraction of the equivalent RC value. As such, a physical model included in the physical model/field solver 514 may provide for equivalent dimensions and/or equivalent RC values of a segment.

In an embodiment, the physical model translates an interconnect pattern segment into discrete squares. An RC parameter value is calculated for a discrete square by the physical model/field solver system 514 and translated back into the physical interconnect pattern. As such, a RC parameter for an interconnect segment can be determined from the accumulation of discrete squares associated with the segment. The RC parameter for each discrete square and/or the interconnect segment, may take into account a plurality of environmental factors.

To perform the extraction of an RC of parameter of the as-drawn interconnect pattern segments and/or the simulated interconnect pattern segments, the physical model/field solver 514 may use various mathematical mapping models. In an embodiment, the physical model/field solver 514 includes a field solver that is commercially available field solver, for example, a conventional 2D or 3D field solver. In an embodiment, the physical model/field solver 514 includes a 3D field solver capable of predicting RC of non-rectangular segments. In an embodiment, a 3D field solver may be used to modify and enhance a physical model's prediction.

In conventional LPE methodology, it is typical that any shape be simplified into standard shape (e.g., rectangle) such that a conventional field solver can provide a corresponding RC parameter, as conventional field solvers are typically operable only to handle simple shapes. Use of the conventional field solver absent the improvements described herein may be disadvantageous as it would require a simplification of an interconnect pattern into, for example, a rectangular shape, in order for a field solver to extract an RC parameter. As such, even if one were to take into account process deviations in a conventional process flow and provide for a modified (e.g., simulated) interconnect pattern, the modified interconnect pattern would require simplification in order to be processed by the field solver. This may introduce additional inaccuracies into the extraction of electrical parameters. For example, even if standard shapes allow for maintaining the shape characteristics of the interconnect pattern, the electrical properties may be distorted because the environmental effects are neglected.

In an embodiment, the physical model/field solver system 514 uses environmental effects in determining the RC parameters for one or more interconnect segments. The interconnect segments including their associated parameters are stored in a pre-characterized and parameterized pattern library 518. The pre-characterized and parameterized pattern library 518 may be substantially similar to the library 312, described above with reference to FIG. 3. The library 518 may also include statistical analysis associated with the segments. The library 518 may further include one or more environmental factors associated with a given interconnect pattern and RC parameter. In an embodiment, the library 518 includes a plurality of interconnect pattern segments and associated RC parameters. In an embodiment, the RC parameters of one or more segments may be accumulated to provide an RC parameter associated with an interconnect pattern such as interconnect pattern 502. In an embodiment, the library 518 includes a plurality of interconnect patterns, each pattern comprising a plurality of segments, and associated RC parameters.

Figure 7:
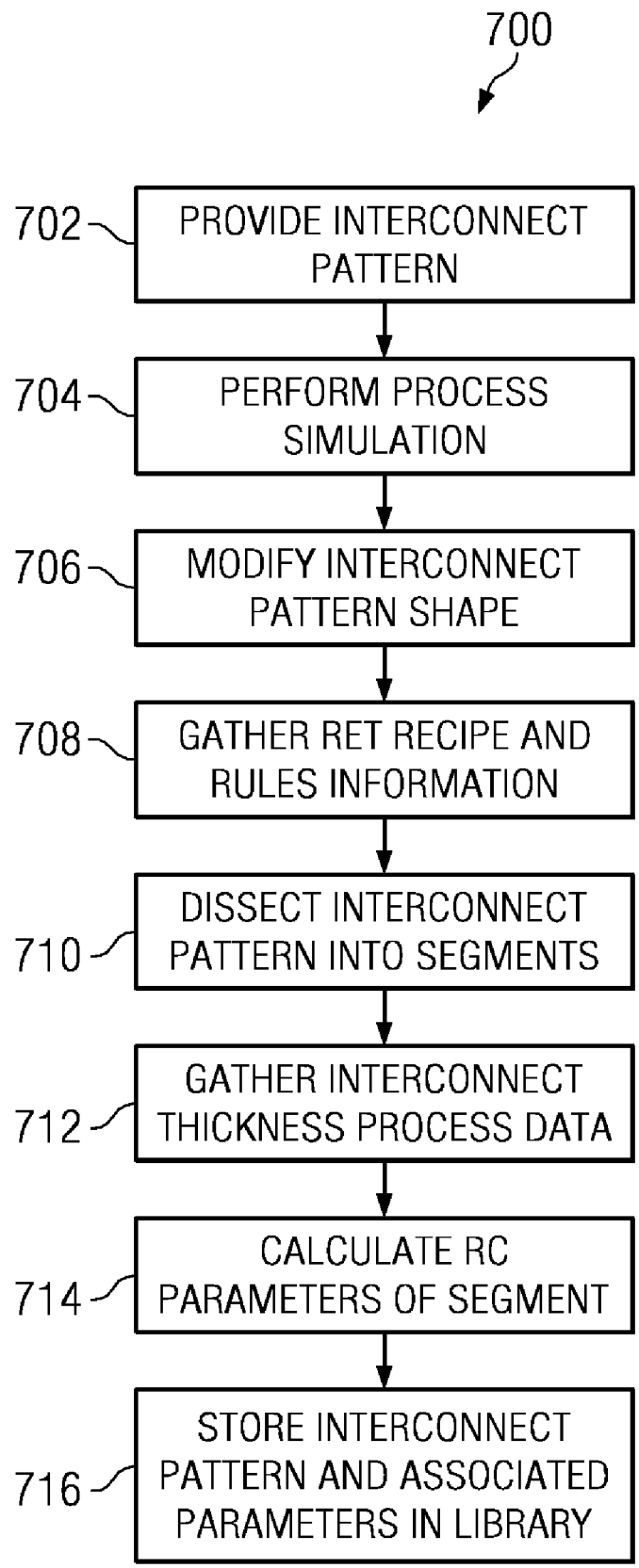
FIG. 7 is a flowchart illustrating an embodiment of a method of determining an RC parameter.

Referring now to FIG. 7, illustrated is a method 700 of extracting RC parameters associated with an integrated circuit, or portion thereof. The method 700 begins at step 702 where an interconnect pattern is provided. The interconnect pattern may include a physical design layout of conductive structures typically used to form interconnections of an IC (e.g., "as-drawn" pattern). The interconnect pattern may be substantially similar to the interconnect pattern 302 and/or the interconnect pattern 502, described with reference to FIGS. 3 and 5 respectively.

The method then proceeds to step 704 where a process simulation is performed on the interconnect pattern or portion thereof. In an embodiment, the process simulation includes a lithography simulation. The lithography simulation may model the effects of, for example, process variations associated with the photolithography process and/or optical proximity correction and other resolution enhancement techniques that may affect the printing of the as-drawn interconnect patterns. The lithography simulation predicts the shape of the as-drawn interconnect pattern or portion thereof when fabricated on a substrate (e.g., provides a simulated-interconnect pattern). Manufacturing data such as processing recipes, tool characterizations, manufacturing environment data, statistical process control data, electrical testing data, measurement data, and/or other data gathered in an IC fabrication process may be used generate the simulated interconnect pattern. The process simulation may be substantially similar to the modification system 304 and/or the process simulation system 504 described above with reference to FIGS. 3 and 5, respectively.

The method 700 then proceeds to step 706 where the shape of the interconnect pattern is modified using the results of the process simulation. For example, in an embodiment, an as-drawn interconnect pattern may include a rectangular shape. The interconnect pattern may be modified to include a shape more accurately reflecting that which would be fabricated. This typically includes variations from an ideal rectangular shape. The modified interconnect pattern may be referred to as the simulated-interconnect pattern. In an embodiment, step 704 and 706 are omitted for one or more interconnect patterns, or portions thereof.

The method 700 then proceeds to step 708 where resolution enhancement technique (RET) recipe and rules information is gathered. The RET recipe and rules information may be associated with the interconnect pattern provided in step 702. In an embodiment, the RET recipe and rules may include the rules for providing optical proximity correction (OPC) features to a design. For example, the recipes and rules may include a definition of the OPC features to be used to print the interconnect pattern provided in step 702. The OPC recipe information may include, for example, target points, bias rules, dissection rules, and/or other OPC information known in the art. In an embodiment, the recipe and rules are provided as table-based references.

The method 700 then proceeds to step 710 where the interconnect pattern, for example, the simulated interconnect pattern shape provided by step 706 and/or the as-drawn interconnect pattern provided in step 702, is dissected into segments. The dissection utilizes the RET recipe and rules provided in step 708 to determine an optimized dissection. The dissection process may be substantially similar to as described above with reference to the dissection system 305 and/or the dissection system 510 of FIGS. 3 and 5 respectively.

The method 700 then proceeds to step 712 where process information is gathered regarding the interconnect thickness. In an embodiment, the process information includes chemical mechanical process (CMP) manufacturing data. The manufacturing data may include process recipes, tool characterizations, manufacturing environment data, statistical process control data (e.g., as gathered in the fabrication process), IC testing data (e.g., physical measurement and/or electrical data) and/or other data known in the art. In an embodiment, the CMP manufacturing data is used to develop a process simulation to model the thickness of an interconnect structure when fabricated.

The method 700 then proceeds to step 714 where an RC parameter is extracted for one or more of the interconnect pattern segments provided by step 710. In an embodiment, the interconnect thickness process data and/or process simulation is used in the extraction of the RC parameters. The extraction may be substantially similar to as discussed above with reference to the library generator 308 and/or the physical model/field solver system 514 of FIGS. 3 and 5 respectively. In an embodiment, a physical model is used to provide an ideal RC parameter and/or equivalent dimensions for a segment. In an embodiment, a field solver (e.g., a 3D field solver) is used in conjunction with a physical model to provide an RC parameter. The 3D field solver may take into account process and design information such as, line-edge-roughness (LER), material interface energy loss, line-cross-section shape and profile, thin film deposition process, and/or other factors known in the art.

The method 700 then proceeds to step 716 where the interconnect patterns, or portions thereof, and associated parameters are stored in a library. The associated parameters may include RC parameters, statistical analysis of RC parameters, environmental effects, and/or other parameters useful for the design and layout of an IC. The library may be substantially similar to the library 312 and/or the library 518 described above with reference to FIGS. 3 and 5 respectively. In an embodiment, the method 700 continues to subsequent steps where the library generated in step 716 is used to extract an RC parameter for an integrated circuit physical layout. In an embodiment, the library may be used to extract an RC parameter for a full-chip IC.

As such, provided is a method, system, and computer-readable medium that may be used to extract electrical parameters associated with given interconnect pattern. The extracted parameters may include parasitic resistance and capacitance (RC parameters). The extracted parameters may allow for more accurate RC parameter prediction for an IC by an LPE tool. The increased accuracy may be provided by taking into account process effects, lithography effects, and/or environmental effects during the generation of an RC library.

Although only a few exemplary embodiments of this invention have been described in detail above, those skilled in the art will readily appreciate that many modifications are possible in the exemplary embodiments without material departing from the novel teachings and advantages of this disclosure.

Thus, provided is a method including providing a layout of an interconnect pattern. A simulation is performed on the interconnect pattern to provide a simulated interconnect pattern. In an embodiment, the simulation is a photolithography process simulation. The simulated interconnect patter is dissected the simulated interconnect pattern into a plurality of segments. In an embodiment, the dissection is performed using OPC rules. An RC parameter is determined for each of the plurality of segments. An RC parameter associated with the interconnect pattern is determined using the segment RC parameters. The interconnect pattern and the determined RC parameter are stored.

Also provided is a computer readable medium including computer-readable instructions to extract an RC parameter. The computer-readable instructions include instructions to receive a layout of an interconnect pattern. A process-model based simulation on the layout of the interconnect pattern is performed providing a simulated-interconnect pattern. An RC parameter associated with the simulated interconnect pattern is determined. The determination may be performed by a physical model.

Further provided, is a system including a process simulation system and a library generator. The process simulation system receives an as-drawn integrated circuit (IC) feature and provides a simulated integrated circuit (IC) feature. In an embodiment, the process simulation system includes photolithography process models. The library generator is operable to receive information from the process simulation system. The library generator determines an RC parameter associated with the simulated-integrated circuit feature. The library generator includes a physical-based shape equivalent calculator.

What is claimed is:

1. A method, comprising:
   providing a layout of an interconnect pattern by using a computer;
   simulating a shape of the interconnect pattern, wherein the simulating provides a simulated interconnect pattern and takes into account a fabrication process effect and a lithography effect;
   dissecting the simulated interconnect pattern into a plurality of segments, wherein the dissecting includes using optical proximity correction (OPC) rules to determine a point of dissection;
   determining a segment RC parameter associated with each of the plurality of segments wherein the determining the segment RC parameter includes using a chemical mechanical process (CMP) model;
   determining an RC parameter associated with the interconnect pattern using the segment RC parameters; and
   storing the interconnect pattern and the determined RC parameter.

2. The method of claim 1, further comprising:
   dissecting the layout of the interconnect pattern, wherein the layout of the interconnect pattern includes an as-drawn pattern.

3. The method of claim 1, wherein the dissecting includes determining an effect of a surrounding feature on the interconnect pattern.

4. The method of claim 3, wherein the effect of a surrounding feature on the interconnect pattern includes the effect of a space to the surrounding feature.

5. The method of claim 1, wherein the storing the interconnect pattern and the determined RC parameter associated with the interconnect pattern includes storing one or more environmental effects associated with the interconnect pattern.

6. The method of claim 1, wherein determining a segment RC parameter associated with each of the plurality of segments is performed by a physical model.

7. The method of claim 6, wherein determining the segment RC parameter associated with each of the plurality of segments further includes using a field solver.

8. A computer readable medium comprising computer-readable instructions, which when executed by a computer, extract an RC parameter, the computer-readable instructions comprising instructions to:
   receive a layout of an interconnect pattern;
   perform a process-model based simulation on the layout of the interconnect pattern, wherein the simulation provides a simulated interconnect pattern, and the process-model based simulation includes a resolution enhancement technique and at least one process variation that is selected from the group consisting of focus point variations, exposure dosage variations, and photomask variations;
   determining an RC parameter associated with the simulated interconnect pattern, wherein the determining includes a physical-based model and a field solver operable to provide an RC parameter; and
   receiving resolution enhancement technique (RET) rules; and
   using the RET rules to dissect the interconnect pattern into a plurality of segments, wherein the physical-based model processes each of the plurality of segments to determine the RC parameter.

9. The computer-readable instructions of claim 8, wherein the determining the RC parameter includes:
   determining an equivalent dimension of the simulated interconnect pattern by the physical-based model; and
   determining an equivalent resistance and an equivalent capacitance associated with the simulated interconnect pattern by the physical model.

10. The computer-readable instructions of claim 8, wherein the performing the process-model based simulation on the layout of the interconnect pattern includes simulating a chemical mechanical polish (CMP) process.

11. The computer-readable instructions of claim 8, wherein the field solver is a 3D field solver capable of predicting a parameter of a non-rectangular segment.

12. A system, comprising:
   a process simulation system configured to receive an as-drawn integrated circuit (IC) feature, provide a simulated integrated circuit (IC) feature, and includes a photolithography process model which uses manufacturing data and design data;
   a dissection system configured to receive information from the process simulation system, and to receive optical proximity correction (OPC) rules to segment the as-drawn IC feature and the simulated IC feature; and
   a library generator configured to receive the simulated IC feature, determine an RC parameter associated with the simulated IC feature, and include a physical-based shape equivalent calculator.

13. The system of claim 12, wherein the library generator includes a field solver operable to calibrate for external effects.

14. The system of claim 12, further comprising:
   a layout parameter extraction (LPE) tool operable to receive information from the library generator, further receive a full-chip integrated circuit layout, and extract a parasitic parameter associated with the full-chip integrated circuit layout using information received from the library generator.

15. The system of claim 12, wherein the physical-based shape equivalent calculator includes a physical model using fabrication process statistical analysis to determine the RC parameter.

16. The system of claim 12, wherein the manufacturing data includes at least one of processing recipes, tool characterization data, electrical testing data, and statistical process control data; and wherein the design data includes at least one of design rules, resolution enhancement rules (RET), and process window settings.

* * * * *